United States Patent

[11] 3,589,678

[72] Inventor Fred L. Magoon
 Oklahoma City, Okla.
[21] Appl. No. 8,477
[22] Filed Feb. 4, 1970
[45] Patented June 29, 1971
[73] Assignee Demco, Incorporated
 Oklahoma City, Okla.

[54] BUTTERFLY VALVE WITH IMPROVED STEM SEALING MEANS
 11 Claims, 5 Drawing Figs.

[52] U.S. Cl. ................................................. 251/306
[51] Int. Cl. ................................................. F16k 1/22
[50] Field of Search ........................................ 137/375,
 454.2; 251/148, 170, 173, 306, 307, 308

[56] References Cited
 UNITED STATES PATENTS
 3,129,920 4/1964 Stillwagon ............... 251/148
 3,376,014 4/1968 Buckley et al. ........... 137/375 X
 3,447,780 6/1969 Hobson .................. 251/306

Primary Examiner—Henry T. Klinksiek
Attorney—Fishburn, Gold and Litman

ABSTRACT: In a butterfly valve of the type having a valve body with a cylindrical bore therethrough and diametrically opposed openings for receiving pivot means, wherein the improvement of stem-sealing means includes a resilient lining adapted to seat within the cylindrical bore and the resilient lining has diametrically opposed openings in alignment with the openings in the valve body and diametrically opposed flat surfaces each having said respective opening centered therein. A substantially rigid butterfly disc is positioned on the diameter passing through the aligned openings and has a rim dimension greater than the interior dimension of the resilient lining and the disc has diametrically opposed flattened surfaces on the rim of the disc, with the flattened surfaces being normal to the diameter passing through the aligned openings in the resilient lining and having a recess in the flattened surfaces to form lands for engagement with and deflection of the respective flat surface of the resilient lining, to effect an uninterrupted line of sealing engagement between the disc and the resilient lining when the disc is moved to a closed position.

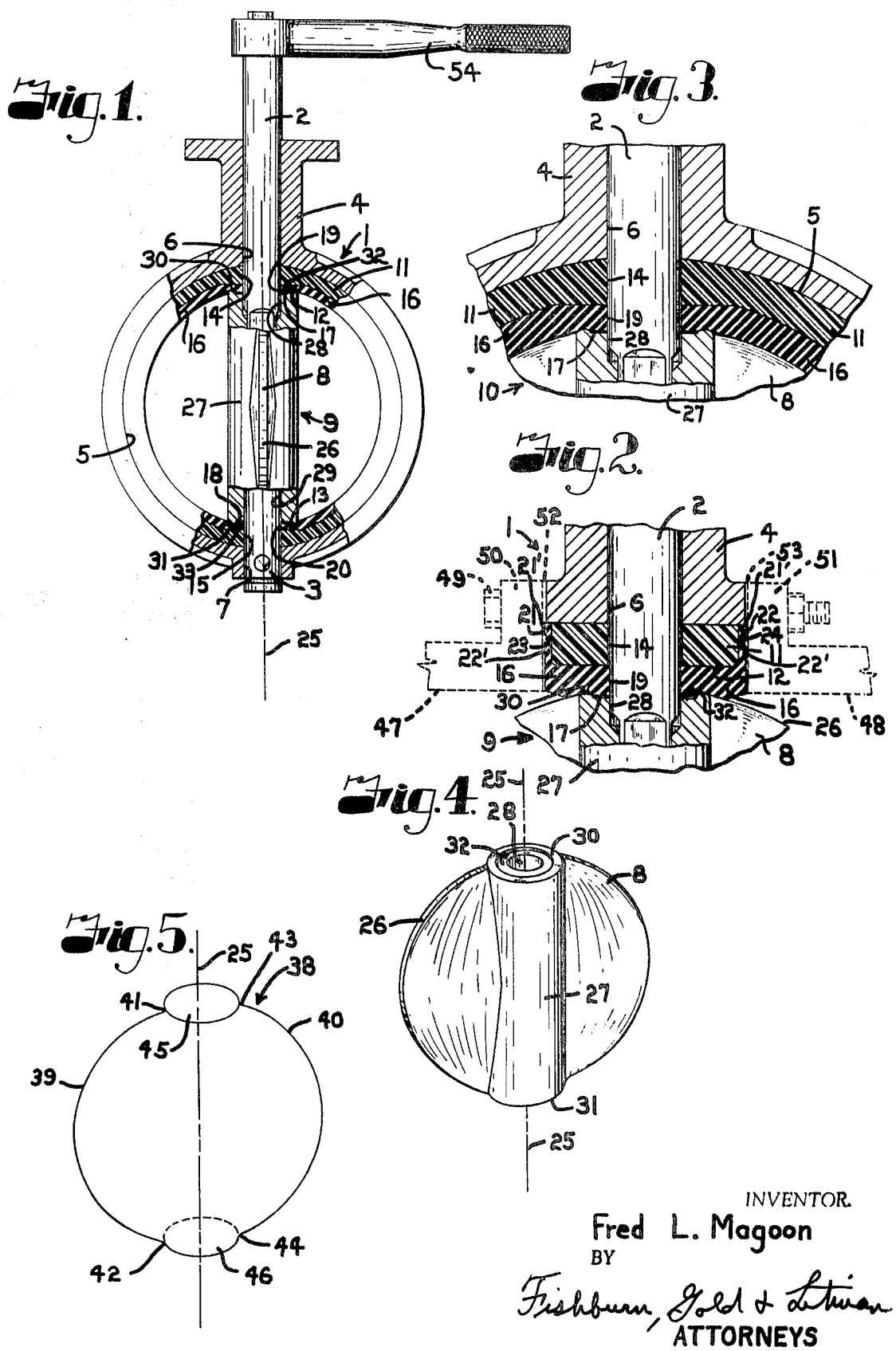

BUTTERFLY VALVE WITH IMPROVED STEM SEALING MEANS

The present invention relates to butterfly valves, and more particularly to an improved sealing arrangement to prevent leakage of fluid through the valve and around a valve stem when a butterfly disc is in closed position.

The principal objects of the present invention are: to provide a butterfly valve with improved stem sealing means; to provide such a butterfly valve having an elastic or resilient seat wherein the seat may be replaced in a minimum of time and with a minimum of effort; to provide such a butterfly valve wherein a minimum of torque is required to rotate a disc from an open to a closed position; to provide such a butterfly valve having a rigid fluorocarbon resin inner lining seating in a cylindrical bore through a valve body and a resilient inner lining seated in the rigid lining wherein the inner lining is deflected by edges of a butterfly disc to close the valve; to provide such a butterfly valve wherein the interfering contact between the disc and the elastic seat forms an uninterrupted line of sealing engagement; to provide such a butterfly valve having reduced wear of seat flats by friction of respective disc flats upon repeated opening and closing of the valve; to provide such a butterfly valve eliminating the requirement for O-rings or the like mounted about stems to prevent escape of fluid to the exterior of the valve; to provide such a butterfly valve which is well adapted for sealing in a seat which has been provided with a rigid fluorocarbon resin liner wherein a relatively narrow sealing land on the disc flats readily deforms a resilient material toward the rigid liner; and to provide such a butterfly valve which is simple and easy to operate, durable in construction, and particularly well adapted for the proposed use.

Other objects and advantages of this invention will become apparent from the following description, taken in connection with the accompanying drawings, wherein are set forth by way of illustration and example certain embodiments of this invention.

FIG. 1 is an end elevational view of a butterfly valve embodying features of the present invention, with portions broken away to better illustrate the component parts and showing a butterfly disc shown in an open position.

FIG. 2 is an enlarged fragmentary longitudinal sectional view showing the butterfly disc in the open position.

FIG. 3 is an enlarged fragmentary transverse sectional view showing the butterfly disc in a closed position.

FIG. 4 is a perspective view of the butterfly disc.

FIG. 5 is a perspective view showing the lines of contact and interference between the butterfly disc and a resilient seat.

Referring more in detail to the drawings:

The reference numeral 1 generally designates a butterfly valve having improved means for sealing around diametrically opposed pivot stems 2 and 3. The butterfly valve 1 has a valve body 4 with a cylindrical bore 5 therethrough and diametrically opposed openings 6 and 7 communicating with the bore 5 and for receiving the stems 2 and 3, respectively, which each have one end thereof mounted in a butterfly disc 8 which is movable between an open position 9 and a closed position 10.

A substantially rigid lining 11 is seated in the cylindrical bore 5 of the valve body 4. The rigid lining 11 has diametrically opposed flat surfaces 12 and 13 having diametrically opposed openings 14 and 15 centered therein respectively and alignable with the openings 6 and 7 for receiving the stems 2 and 3, respectively.

A resilient inner lining 16 is adapted to seat in the rigid lining 11 and the resilient inner lining 16 has diametrically opposed flat surfaces 17 and 18 substantially parallel to the flat surfaces 12 and 13 respectively of the rigid lining 11. The resilient inner lining 16 has diametrically opposed openings 19 and 20 centered in the flat surfaces 17 and 18 respectively and alignable with the openings 14 and 15 respectively in the rigid lining 11 and the openings 6 and 7 in the valve body 4 for receiving the stems 2 and 3 therethrough. The resilient inner lining 16 has end flanges or extensions 21 and 22 extending radially over ends 23 and 24 respectively of the rigid lining 11, with spaced ribs 21' and 22' on the outer side thereof for sealingly mounting the valve 1, as later described.

The flat surfaces 17 and 18 of the resilient inner lining 16 are centered relative to the flat surfaces 12 and 13 respectively of the rigid lining 11, and the flat surfaces 17 and 18 each have dimensions less than the dimensions of the respective flat surfaces 12 and 13 in the rigid lining 11.

The butterfly disc 8 is a substantially rigid member positioned on a diameter 25 which is colinear with an axis of the stems 2 and 3 and which passes through the aligned openings 6 and 7, 14 and 15, and 19 and 20. The disc 8 is a generally circular member having a rim portion 26 with the exterior periphery thereof having a dimension greater than the interior dimension of the resilient inner lining 16, to effect sealing engagement therebetween when the disc 8 is in the closed position 10.

The butterfly disc 8 has a generally cylindrical boss 27 having diametrically opposed bore portions 28 and 29, with the axis of the bore portions 28 and 29 being colinear with the diameter 25. One of the stems and one of the bore portions, for example stem 2 and bore portion 28, have cooperating engageable square or flat portions whereby the disc 8 is turned in response to turning the stem 2. The other stem 3 and the other bore portion 29 are cylindrical whereby the stem 3 serves as a trunnion for the disc 8 when same is turned within the bore 5 of the valve body 4.

The boss 27 has diametrically opposed flattened surfaces 30 and 31 substantially parallel with surfaces 17 and 18 respectively of the resilient inner lining 16. The flattened surfaces 30 and 31 are substantially normal to the axis of the bore portions 28 and 29 and the diameter 25 through the respective aligned openings for stems 2 and 3. The flattened surfaces 30 and 31 have recesses 32 and 33 therein respectively to form lands for engagement with and deflection of the respective flat surfaces 17 and 18 of the resilient inner lining 16.

The lands each have a greater longitudinal spacing therebetween than the spacing between flat surfaces 17 and 18 in the resilient lining 16, whereby rotation of the disc 8 to the closed position 10 effects a closed line of sealing engagement between the disc 8 and the resilient inner lining 16.

The lands are each shaped to form a portion of the circumference of the rim portion 26 of the disc 8 and to form a portion of the respective flattened surfaces 30 and 31 at the intersection of the flattened surfaces 30 and 31 with the rim portions 26 of the disc 8.

The recesses 32 and 33 within the flattened surfaces 30 and 31 respectively each form a reservoir within the respective lands for accommodating displaced material of the resilient inner lining 16. In the illustrated structure, the recesses 32 and 33 each have bottom walls spaced from a plane normal to the diameter 25 passing through the respective aligned openings and the plane extends through the intersection of the respective flattened surface and the rim portion 26 of the disc 8 a distance sufficient to avoid interference between the respective bottom wall with the flat surface 17 or 18 of the resilient inner lining 16.

The flat surfaces 12 and 13 in the rigid lining 11 may be formed in any shape, however, the flat surfaces 12 and 13 have been illustrated as circular or annular. The flat surfaces 17 and 18 in the resilient inner lining 16 may also be formed in any shape, however, the flat surfaces 17 and 18 have been illustrated as circular or annular and each have a diameter less than the diameter of the respective flat annular surfaces 12 and 13 in the rigid lining 11.

When the flat surfaces 17 and 18 are circular or annular and the flattened surfaces 30 and 31 are also circular or annular, it is preferable that the flattened surfaces 30 and 31 have a diameter substantially equal to the diameter of the respective flat annular surfaces 17 and 18 respectively in the resilient inner lining 16 engaged thereby. The recesses 32 and 33 in each of the flattened surfaces 30 and 31 are annular and have a diameter sufficiently greater than the diameter of the stems 2 and 3 respectively to provide a reservoir of uncompressed resilient material between the respective stem and the point of intersection of the respective flattened surfaces 30 and 31 and the rim portion 26 of the disc 8.

An uninterrupted or continuous line of sealing engagement is effected between the disc 8 and the resilient inner lining 16 and is a closed figure 38, as shown in FIG. 5. The closed figure 38 has a pair of arcs 39 and 40 each having opposite ends thereof spaced from respective opposite ends of the other arc. In the illustrated figure, the arc 39 has ends 41 and 42 spaced from ends 43 and 44 respectively of the arc 40. The arcs 39 and 40 are in a plane having therein the diameter 25 passing through the respective aligned openings and the arcs 39 and 40 indicate the interfering engagement between the rim portion 26 and the resilient inner lining 16.

The closed figure 38 includes a pair of circles 45 and 46 which are normal to and longitudinally spaced along the diameter 25 passing through the respective aligned openings. Each of the circles 45 and 46 has one end of each of the arcs 39 and 40 intersecting the respective circle to form a closed figure with the points of intersection of the arcs 39 and 40 with each of the circles 45 and 46 being at diametrically opposed points thereon. The circles 45 and 46 represent the interfering engagement between the lands and the flat annular surfaces 17 and 18 respectively of the resilient inner lining 16.

In use, the butterfly valve 1 is positioned between facing ends of pipe sections 47 and 48 and suitably secured therebetween, as by a plurality of circumferentially spaced bolts 49 extending through flanges 50 and 51 of the pipe sections 47 and 48 respectively. The end flanges 21 and 22 of the resilient inner lining 16 are positioned to sealingly engage the flanges 50 and 51 when the bolts 49 are tightened. It may be desirable to position gaskets 52 and 53 between the flanges 50 and 51 and ends of the valve body 4. The gaskets 52 and 53 have substantially the same thickness as the ribs 21' and 22' and are also compressed by tightening the bolts 49. A suitable handle 54 is mounted on one of the stems, for example stem 2, for rotatably moving the disc 8 between the open and closed positions 9 and 10, to effect the uninterrupted line of sealing engagement between the disc and the resilient inner lining represented by the closed figure 38.

It is to be understood that while I have illustrated and described one form of my invention, it is not to be limited to the specific form or arrangement of parts herein described and shown.

What I claim and desire to secure by Letters Patent is:

1. A butterfly valve comprising:
 a. a valve body with a cylindrical bore therethrough and diametrically opposed openings communicating with said bore, pivot means rotatably mounted in said bore;
 b. a resilient inner lining in the cylindrical bore of the valve body and seated therein;
 c. diametrically opposed openings in said resilient inner lining aligned with the respective openings in the valve body;
 d. diametrically opposed flat surfaces formed in said resilient inner lining and each having said respective opening centered therein;
 e. a substantially rigid butterfly disc on a diameter passing through said aligned openings and having a rim dimension greater than the interior dimension of said resilient inner lining said disc operatively engaging said pivot means;
 f. diametrically opposed flattened surfaces on the rim of said disc, said flattened surfaces being normal to the diameter passing through said aligned openings, said flattened surfaces each having a recess therein to form lands for engagement with and deflection of said respective flat surface of said resilient inner lining; and
 g. means for rotatably moving said disc to effect an uninterrupted line of sealing engagement between said disc and said resilient inner lining.

2. In a butterfly valve of the type including a valve body with a cylindrical bore therethrough and diametrically opposed openings for receiving pivot means, the improvement of means for high-pressure leakproof sealing comprising:
 a. a substantially rigid lining for the cylindrical bore of the valve body, said rigid lining having an outer surface adapted to seat in the cylindrical bore;
 b. a resilient inner lining adapted to seat in the rigid lining;
 c. diametrically opposed openings in said rigid lining and said inner lining adapted for alignment with the openings in the valve body;
 d. diametrically opposed flat surfaces formed in said resilient inner lining and each having said respective opening centered therein;
 e. a substantially rigid butterfly disc on a diameter passing through said aligned openings and having a rim dimension greater than the interior dimension of said resilient inner lining;
 f. diametrically opposed flattened surfaces on the rim of said disc, said flattened surfaces being normal to the diameter passing through said aligned openings, said flattened surfaces each having a recess therein to form lands for engagement with and deflection of said respective flat surface of said inner lining; and
 g. means for rotatably moving said disc to effect an uninterrupted line of sealing engagement between said disc and said resilient inner lining.

3. In the butterfly valve as set forth in claim 2 wherein:
 a. said lands are each shaped so that one portion thereof forms a portion of the circumference of said disc; and
 b. said lands are each shaped so that another portion thereof forms a portion of said respective flattened surface of said disc, said first-named portion and said other portion of said lands being coplanar with the intersection of said flattened surfaces and the rim of said disc.

4. In the butterfly valve as set forth in claim 3 wherein:
 a. said recess in each of said flattened surfaces of said disc has a bottom wall spaced from a plane normal to the diameter passing through said aligned openings and extending through the intersection of said respective flattened surface and the rim of said disc a distance sufficient to avoid interference between said respective bottom wall and said flat surface of said resilient inner lining.

5. In the butterfly valve as set forth in claim 4 wherein:
 a. said means for rotatably moving said disc is a stem on the diameter passing through said aligned openings; and
 b. said recess in each of said flattened surfaces of said disc is annular and has a diameter sufficiently greater than the diameter of the stem to provide a reservoir of uncompressed resilient material between the stem and the point of intersection of said respective flattened surface and the rim of said disc.

6. In the butterfly valve as set forth in claim 5 wherein the uninterrupted line of sealing engagement between said disc and said resilient inner lining is a closed figure including:
 a. a pair of arcs each having opposite ends thereof spaced from respective opposite ends of the other arc; and
 b. a pair of circles normal to and longitudinally spaced along the diameter passing through said aligned openings, each of said circles having one end of each arc intersecting said circle to form a closed figure.

7. In the butterfly valve as set forth in claim 3 wherein:
 a. said rigid lining has diametrically opposed flat annular surfaces with each flat annular surface having said respective opening centered therein;
 b. said flat annular surfaces in said resilient inner lining has a diameter less than the diameter of the respective flat annular surface in said rigid lining; and
 c. said lands each have a diameter substantially equal to the diameter of said respective flat annular surface in said resilient inner lining engaged thereby.

8. A disc-type flow control valve comprising:
 a. a valve body having a cylindrical bore therethrough and diametrically opposed openings communicating with said bore;

b. a substantially rigid lining for the cylindrical bore of the valve body and having an outer surface adapted to seat in the cylindrical bore, said rigid lining having diametrically opposed flat surfaces each having said respective opening centered therein;
c. a resilient inner lining adapted to seat in the rigid lining, said inner lining having end flanges extending radially over the ends of said rigid lining;
d. diametrically opposed openings in said rigid lining and said inner lining adapted for alignment with the openings in the valve body;
e. diametrically opposed flat surfaces formed in said resilient inner lining with each surface having said respective opening centered therein;
f. a substantially rigid butterfly disc on a diameter passing through said aligned openings and having a rim dimension greater than the interior dimension of said resilient inner lining;
g. pivot means received in said disc and through said opposed openings in said body and said rigid and resilient linings for rotatably moving said disc; and
h. diametrically opposed flattened surfaces on the rim of said disc, said flattened surfaces being normal to the diameter passing through said aligned openings, said flattened surfaces each having a recess therein to form lands for engagement with and deflection of said respective flat surface of said resilient inner lining, said lands having a greater spacing therebetween than the spacing between said flat surfaces in said resilient inner lining whereby rotation of said disc to a closed position effects a closed line of sealing engagement between said disc and said resilient inner lining.

9. The disc-type valve as set forth in claim 8 wherein:
a. said lands forming recesses in said flattened surfaces form a reservoir within said lands for accommodating displaced material of said resilient inner lining; and
b. said recess in each of said flattened surfaces of said disc has a bottom wall spaced from a plane normal to the diameter passing through said aligned openings and extending through the intersection of said respective flattened surface and the rim of said disc a distance sufficient to avoid interference between said respective bottom wall and said flat surface of said resilient inner lining.

10. The disc-type valve as set forth in claim 9 wherein:
a. said lands are each shaped so that one portion thereof forms a portion of the circumference of said disc and another portion of said lands forms a portion of said respective flattened surface of said disc coplanar with the intersection of said flattened surface of said disc and the rim of said disc;
b. said flat surfaces in said resilient inner lining has dimensions less than the dimensions of the respective flat annular surface in said rigid lining; and
c. said lands each have a diameter substantially equal to the diameter of said respective flat surface in said resilient inner lining engaged thereby.

11. The disc-type valve as set forth in claim 10 wherein the closed line of sealing engagement between said disc and said resilient inner lining includes:
a. a pair of arcs each having opposite ends thereof spaced from respective opposite ends of the other arc, said arcs being in a plane having therein the diameter passing through said aligned openings; and
b. a pair of circles normal to and longitudinally spaced along the diameter passing through said aligned openings, each of said circles having one end of each arc intersecting said circle to form a closed figure, said points of intersection of said arcs with each of said circles being at diametrically opposed points thereon.